United States Patent [19]

Siarto

[11] 4,246,683
[45] Jan. 27, 1981

[54] MACHINE TOOL

[75] Inventor: Andrew V. Siarto, West Bloomfield, Mich.

[73] Assignee: Siarto Machine & Tool Co., Inc., Novi, Mich.

[21] Appl. No.: 972,300

[22] Filed: Dec. 22, 1978

Related U.S. Application Data

[63] Continuation-in-part of Ser. No. 801,181, May 27, 1977, abandoned.

[51] Int. Cl.³ .............................................. B23P 23/00
[52] U.S. Cl. ...................................... 29/38 C; 29/563; 74/813 R; 74/815; 408/71
[58] Field of Search ............... 408/44, 71; 29/568, 29/38 C, 563, 48.5 R; 74/813 R, 813 L, 819, 817, 815; 409/221

[56] References Cited

U.S. PATENT DOCUMENTS

| | | | |
|---|---|---|---|
| 2,967,440 | 1/1961 | Hunter | 74/815 X |
| 3,048,059 | 8/1962 | Cross | 74/813 X |
| 3,609,838 | 10/1971 | Wiest | 408/44 X |

FOREIGN PATENT DOCUMENTS

| | | | |
|---|---|---|---|
| 2531559 | 1/1976 | Fed. Rep. of Germany | 74/813 R |
| 1348125 | 3/1974 | United Kingdom | 74/813 L |

Primary Examiner—William R. Briggs
Attorney, Agent, or Firm—Cullen, Sloman, Cantor, Grauer, Scott & Rutherford

[57] ABSTRACT

A machine tool wherein an annular gear is rotatable in a horizontal plane to carry a plurality of pallets between adjacent peripherally arranged machine stations. The gear is lowered as each machine station is attained by the entry of gear support bearings into recesses in the underside of the gear. The pallets are supported on the gear for limited vertical and horizontal movement, and lowering of the gear positions the pallet on an abutment surface in alignment with the machining station. As the gear is further lowered, it is spaced from the pallet so as not to interfere with independent positioning of the pallet by any power actuated positioning means located at each machining station. Thus, the pallet can be adjusted independently of the gear when the gear is in its lowered position, yet is carried by the gear when the gear is in its elevated position. After the machining operation is completed, the pallet is released from its clamped position, the gear is raised to again support the pallet, and the gear is rotationally actuated to carry the pallet into alignment with the next successive machine position.

1 Claim, 5 Drawing Figures

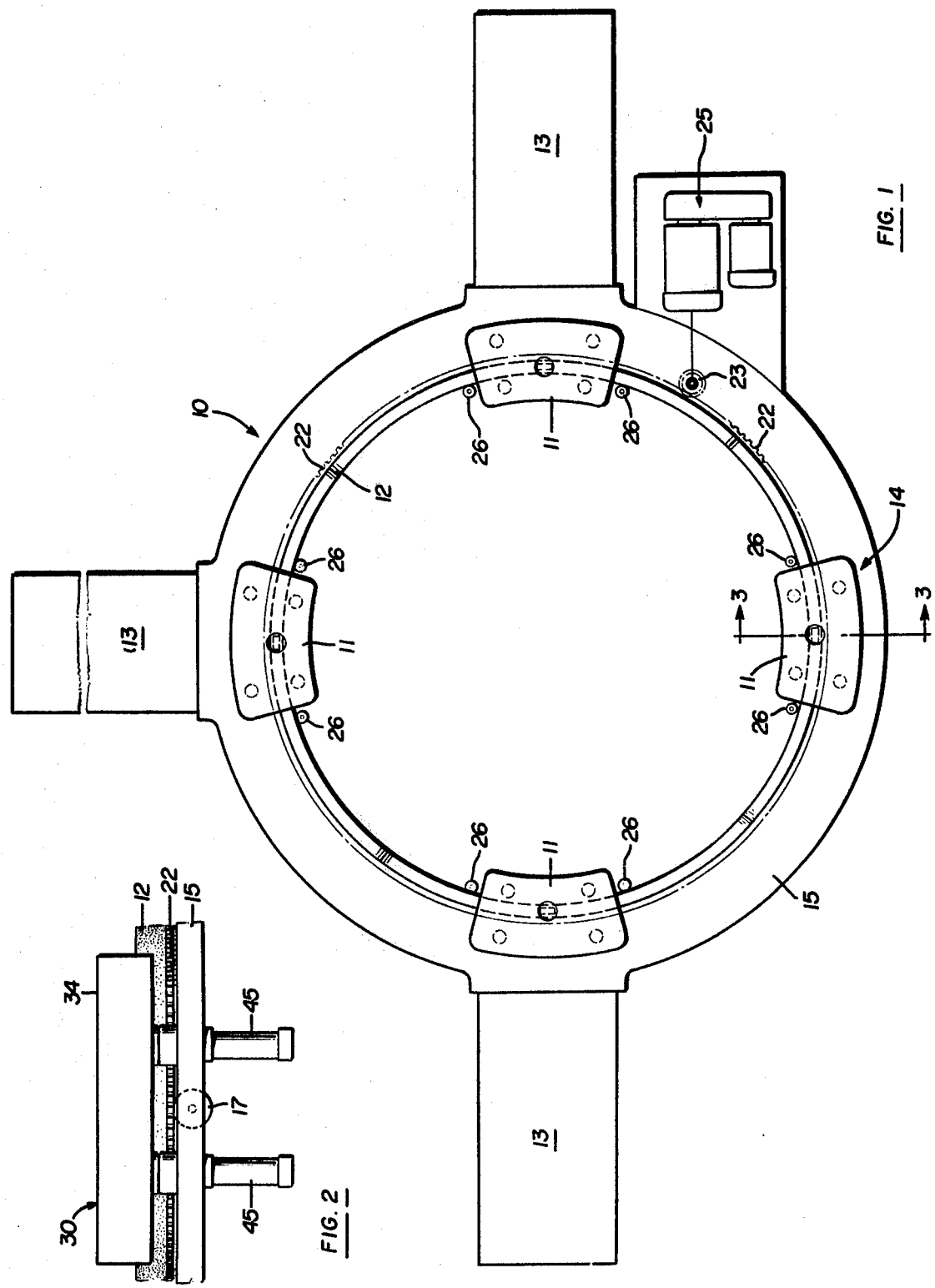

MACHINE TOOL

REFERENCE TO RELATED APPLICATIONS

This instant application is a continuation-in-part application of my earlier filed application, Ser. No. 801,181, filed May 27, 1977, now abandoned.

BACKGROUND OF THE INVENTION

The present invention constitutes a specific, needed improvement over the machine tool disclosed in U.S. Pat. No. 3,609,838 to H. Wiest.

In the Wiest patent, a pallet is carried by a rotary gear into rough alignment with successive, peripherally spaced machining locations. The pallet is connected to the gear by means of a "spring pack", wherein a spring urges the pallet and the parts loaded on the pallet vertically upwardly into spaced relation above the gear. At the machining location, the gear is halted, and hydraulically actuated clamping devices pull the pallet downwardly relative to the gear and against the load of the spring pack to fix the pallet to a machine base in accurate alignment for machining.

The spring pack must exert substantial force upwardly to enable the pallet and its load of parts to float above the gear during transport. This spring force must be overcome by the clamping mechanism in order to pull the pallet downwardly into clamped position at each machine station prior to machining. The spring load has proven to be critical in use, and each individual machine tool must be fitted with specific spring packs depending upon the weight of the pallet, the weight and number of the parts to be machined, etc. Additionally, the necessity of overcoming the spring force with the clamping elements reduces the net clamping force securing the pallet in position during machining.

It would be desirable from an economic and functional standpoint to eliminate the spring arrangement interposed between the pallet and the carrying gear.

BRIEF SUMMARY OF THE INVENTION

The present invention proposes a specific improvement over the Wiest structure wherein the gear is supported on the machine base for vertical movement; the gear being elevated for transport and being lowered at the machining location. The pallet is secured to the gear through a simple loss motion connection so that lowering of the gear initially lowers the pallet onto a support surface at the machining location, with further lowering of the gear spacing the gear from the pallet so as not to interfere with any subsequent positioning and clamping of the pallet which may be accomplished by any well-known conventional positioning device.

In the operation of the device, the pallet is gravitationally urged against the upper surface of the gear by the weight of the pallet and the weight of the load superimposed thereon at all times when the gear is elevated, i.e., during movement of the gear to carry the pallet between successive machining stations. At the machining station, the gear is lowered, initially positioning the pallet on abutments at the machining location and finally moving the gear downwardly beneath the pallet. Conventional positioning and clamping means are then actuated to finally position the pallet at the machining station and to clamp the pallet in position independently of the gear, the loss motion connection between the gear and the pallet accommodating such movement of the pallet relative to the gear. After machining and after release of the clamping elements, the gear is raised to lift the pallet from the abutments and to carry the pallet to the next successive machining station.

The present invention also proposes an extremely simple, effective means of raising and lowering the gear. In essence, the gear is positioned on rollers which contact the undersurface thereof, and these rollers enter cam recesses formed in the undersurface of the gear when the gear when the gear is positioned at each machining station, the cam recesses accommodating lowering of the gear at the desired station. By closely fitting the cam recesses to the rollers and by elevating and lowering the gear through a limited distance, the gear motion is substantially completely vertical.

The present invention provides an improved machine tool of annular configuration wherein a pallet is transferred between adjacent peripherally spaced machining stations by an annular gear which is raised and lowered to roughly position the pallet at a machining station.

It is a further object of the present invention to provide an annular carrier gear for carrying a pallet between adjacent, peripherally spaced machining stations, the gear being in a first elevated station during such transport and being lowered to a second position at the machining station to position the pallet at the station and to accommodate any conventional final location or clamping of the pallet at the station independently of the gear, the gear being raised and lowered by a plurality of support bearings engaging the undersurface thereof and enterable into recesses in the gear undersurface to accommodate lowering of the gear to its second position, and the pallet being positioned on a support during the lowering of the gear.

ON THE DRAWINGS

FIG. 1 is a schematic plan view of a machine tool of the present invention;

FIG. 2 is a fragmentary, schematic, side elevational view of the machine tool of FIG. 1;

DETAILED DESCRIPTION OF THE PREFERRED EMBODIMENT

Figure 3:
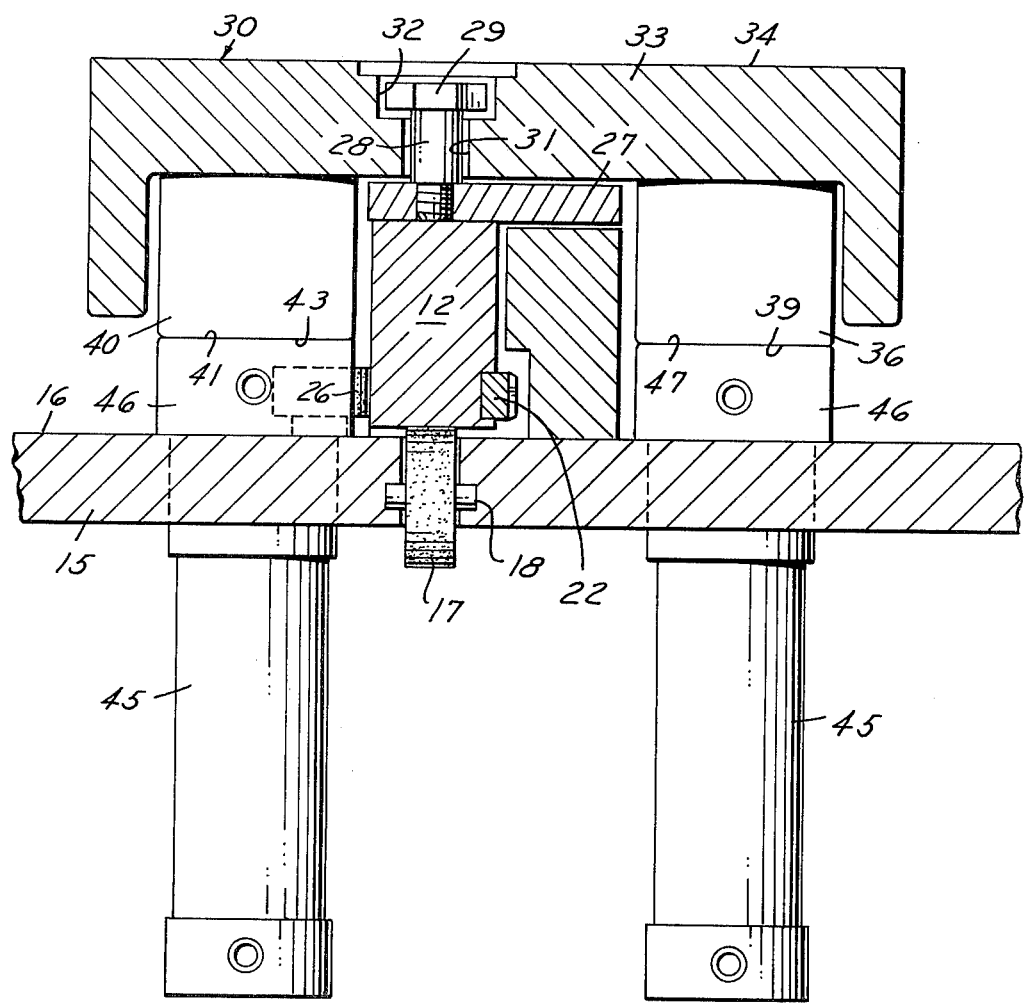
FIG. 3 is an enlarged, fragmentary, sectional view taken along the plane 3—3 of FIG. 1.

In FIG. 1, reference numeral 10 refers generally to a machine tool of the general type illustrated in greater detail in Wiest U.S. Pat. No. 3,609,838, the machine tool consisting of a plurality of pallets 11 carried by an annular transport gear 12 for movement to successive machining locations 13 and to a loading and unloading location 14. The pallets 11 carry on their upper surfaces parts (not shown) to be machined at each of the machining locations 13.

As best shown in FIG. 3, the machine tool 10 includes a base 15 having a horizontal upper support surface 16. The base 15 is shown as annular, although the base may, if desired, be composed of individual support stands arranged in a composite annular array and underlying the gear 12. The gear 12 is supported on a plurality of rollers 17 mounted on the base 15 to be freely rotatable about axles 18 and to contact the undersurface 19 of the gear. As shown, four such rollers 17 are provided, and the undersurface of the gear 12 is provided with cam recesses 20 of a size and location to simultaneously receive the four rollers 17. As best shown by a comparison of FIGS. 4 and 5, entry of the rollers into the recesses 20 lowers the gear relative to the support 15 and, if desired, into contact with the upper surface 16 of the support 15.

As best shown in FIGS. 1 and 3, the gear 12 is provided with outwardly directed gear teeth 22 which mesh with a drive pinion 23 driven by a drive train 25. The gear is positioned laterally by a plurality of thrust rollers 26 contacting the inner periphery of the gear. Secured to the top of the gear at four locations (in the illustrated embodiment) are mounting plates 27 carrying mounting bolts 28 having enlarged heads 29 for securing a pallet 30 to each of the mounting plates 27. Each pallet is provided with an enlarged bore 31 through which the shank of the bolt 28 projects and an enlarged recess 32 into which the head 29 of the bolt projects to loosely interconnect the pallet with the gear, the clearance between the bolt shank 28 and the bore 31 and the bolt head 29 within the recess 32 forming a lost motion connection therebetween. Each pallet 30 is provided with a central support portion 33 having an upper support surface 34 upon which are supported the parts to be machined. The support portion 33 of the pallet 30 is provided with two depending bosses 36 and 40. Positioned at each machining station are four fluid pressure cylinders 45 which depend from the support 15 and have upper extremities 46 overlying the surface 16 of the support 15 to provide upper abutment surfaces 41 and 47. These abutment surfaces contact the lower surfaces 39 and 41 of the embossments 36 and 40 when the pallet 30 is lowered at the machining positions.

Figure 4:
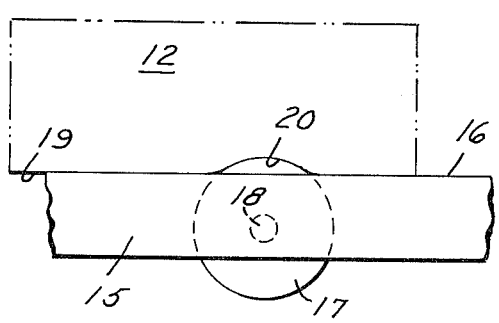
FIGS. 4 and 5 are schematic illustrations of the gear and bearing arrangement of the present invention for raising and lowering the gear.
Figure 5:
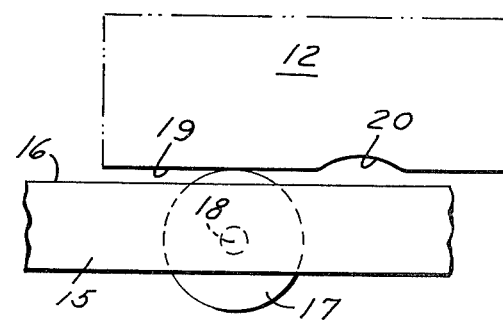

In the operation of the device of the present invention, it will be appreciated that, during transport of the pallets 33 from one machining station to the next, the gear 12 is raised from its position of FIGS. 3 and 4 to its position of FIG. 5. At this time, the pallets 33 and the parts loaded thereon are supported directly by the gear 12 through the support brackets 27. The weight of the pallet and the parts thereon holds each pallet downwardly against the brackets 27, and the lost motion connection of the bolt 28 in the bore 31 limits any movement of the pallet relative to the gear during rotational movement.

When the pallets 33 are each vertically aligned with a machine station 13, 14, the recesses 20 in the undersurface of the gear 12 are aligned vertically with the adjacent rollers 17 and, upon entry of the rollers 17 into the adjacent recesses 20, the gear is lowered to its position of FIG. 3. It will be noted from FIG. 4 that each of the rollers 17 fits into the adjacent recess 20 without any substantial longitudinal lead-in. The extent of the vertical movement of the gear 12 is quite small and this slight degre of movement, plus the configuration of the recesses 20, insures substantially true vertical movement of the gear 12 between its raised and lowered position.

After the machining operation is complete, the pinion gear 23 is actuated by the driving mechanism 23 and the gear 12 is rotated through its next arc of movement. Initial movement of the gear will move the recesses 20 away from the rollers 17 into contact with the undersurface 19 of the gear, thereby elevating the gear. Elevation of the gear 12 will contact the support plates 27 with the undersurface of the pallet 30, elevating the pallet for indexing movement with the gear.

It will, of course, be understood that the number and spacing of the machining stations 13, 14 can be varied, that the numbers of support rollers 17 and recesses 20 may be varied to provide the necessary support for the gear 12, and that the dimensional relationships above described in connection with the raising and lowering of the gear 12 may also be varied without departing from the inventive concept of this invention.

I claim:

1. A machine tool having a plurality of machining stations and a combined loading and unloading station located adjacent a horizontal support surface, an annular gear overlying said support surface, a plurality of rollers, one for each station, engaging the undersurface of the gear to support said gear for rotation about a vertical axis, a plurality of arcuate recesses in the undersurface of the gear corresponding in number to the number of said machining and loading and unloading stations, each of said recesses receiving a roller therein to accommodate lowering of said gear while supported on said rollers, a pallet at each station for supporting a part to be machined at a machining station, means interconnecting each pallet and said gear for joint rotational and vertical movement, yet accommodating limited relative vertical and horizontal movement therebetween, a pallet abutment surface located adjacent each of said stations and positioned above the support surface and in the path of vertical movement of the corresponding pallet as said gear is lowered, each pallet first engaging the corresponding abutment surface as each roller enters a recess upon the lowering of said gear to thereby position the pallets in alignment with said stations, said pallets being retained on said abutment surfaces independently of said gear as the gear is lowered, the interconnecting means accommodating such retention of each pallet on the corresponding abutment surfaces.

* * * * *